United States Patent Office 3,442,728
Patented May 6, 1969

3,442,728
GELLED NITRIC ACID BLASTING AGENT
Robert Alan Simpson, San Mateo, Calif., assignor to American Cyanamid Company, Stamford, Conn., a corporation of Maine
No Drawing. Continuation-in-part of application Ser. No. 592,750, Nov. 8, 1966. This application Dec. 29, 1967, Ser. No. 694,384
Int. Cl. C06b 1/04
U.S. Cl. 149—56                 10 Claims

ABSTRACT OF THE DISCLOSURE

Blasting composition comprising nitric acid, a gelling agent and a nitric acid-miscible, soluble or reactive organic fuel comprising a nitroaromatic compound. The composition can contain as an additional fuel a nitric acid miscible, soluble or reactive nitroparaffin compound. The composition can also contain additional materials such as oxidizers, density modifiers, or cross-linking agents.

---

This application is a continuation-in-part of application Ser. No. 592,750, filed Nov. 8, 1966 and now abandoned.

This invention relates to gelled blasting compositions containing nitric acid and a nitric acid-miscible soluble or reactive nitroaromatic compound. More particularly, it relates to the provision of a blasting composition in gelled form having as its essential components nitric acid, a nitric acid-miscible or soluble nitroaromatic compound, a gelling agent and water.

Blasting compositions containing nitric acid have been known for many years. One type is the combination of nitric acid and a nitroaromatic compound. Such materials have the severe disadvantage of being in liquid form and corrosive in nature, and thus difficult to handle. Attempts to overcome this disadvantage have involved using glass containers with separate internal compartments for the nitric acid component and the aromatic nitro component. These attempts have been far from successful in that the packaging and handling problems involved with the use of glass containers filled with nitric acid are almost insurmountable, since explosives are used under rough field conditions.

It is an object of the present invention to provide a blasting composition based upon nitric acid, a nitric acid-miscible or soluble nitroaromatic compound and a gelling agent. It is a further object of the present invention to provide such a blasting composition in the form of a water-containing gel which is of high blasting strength and physical stability under normal field conditions. Other objects will be apparent from the ensuing description of this invention.

In accordance with this invention, it has been discovered that nitric acid in combination with a nitric acid-miscble or soluble nitroaromatic compound and a gelling agent which is stable in the presence of nitric acid, provides a very useful blasting composition, which is capable of detonation under field conditions. The blasting compositions of the present invention may advantageously contain other materials which do not interfere with blasting capabilities, but do impart properties which may be desirable to most specific conditions of use. Thus, it may be desirable to add an additional fuel material, ammonium nitrate, a density modifying agent and a cross-linking agent to enhance the activity of the gelling agent.

The nitric acid which can be used herein is an aqueous solution of about 30 to 98% concentration. Nitric acid of about 50 to 90% concentration is very suitable for use in the present invention and such compositions, being readily available in commerce, are preferred. Nitric acid solutions of less than 50% concentration tend to become insensitive to normally employed detonation techniques.

The nitroaromatic compounds which are useful in this invention are, as stated above, at least partially acid miscible or soluble. The degree of solubility or miscibility which is required is dependent on the proportions of the nitroaromatic compound in the blasting composition. Solubility or miscibility should be sufficient to permit blending of the nitric acid and nitroaromatic compound without a great detal of separation of these components into different phases. When the nitroaromatic compound is a solid, it is important that it is sufficiently soluble to be dissolved in the aqueous nitric acid to the extent that it is present. When the nitroaromatic compound is a liquid, it is important that it is acid-miscible to the extent of its presence in the composition since otherwise it will form a second liquid phase which might not gel and would create handling and packaging problems. A small amount of undissolved solid nitroaromatic fuel is tolerable within the framework of the present invention. However, it is desirable to minimize the quantity of undissolved fuel components.

The nitroaromatic compounds useful in the present invention as the primary fuel material are nitric acid miscible or soluble materials which have at least one nitro group substituted on an aromatic nucleus. Examples of nitroaromatic fuels are nitrobenzene, dinitrobenzene, nitrotoluene, dinitrotoluene, nitrophenol, dinitrophenol, nitroxylene, dinitroxylene, nitroresorcinol, dinitroresorcinol, nitromesitylene, dinitromesitylene, nitroaniline, dinitroaniline, nitrocresol, dinitrocresol, nitronaphthalene, dinitronaphthalene, nitroanisol, dinitroanisol, nitrophenetol, dinitrophenetol, trinitrobenzene, trinitrotoluene, trinitronaphthalene, trinitrophenol, trinitroxylene, trinitromesitylene, trinitroresorcinol, trinitroanisol, trinitroaniline and tetranitroaniline. The preferred materials are dinitrotoluene, nitrobenzene and trinitrotoluene.

The blasting compositions of this invention contain a gelling agent which is stable in the presence of aqueous nitric acid. The choice of a gelling agent is, in this sense, critical. Among the commercially available materials are water soluble copolymers of methyl vinyl ether and maleic anhydride, available under the tradename "Gantrez AN" resins; water soluble copolymers based on the reaction of ammonia and the interpolymer of methyl vinyl ether and maleic anhydride; polyvinylpyrrolidones of various grades; polyacrylic acids and ammonium polyacrylates; copolymers of ethylene and maleic anhydride; copolymers of styrene and maleic anhydride, available under the tradename "Lytron 810"; copolymers of acrylamide and N,N'-methylene bisacrylamide; and polyacrylamide; polyethylene oxide. Anhydrous silica is also useful as a gelling agent since it is acid resistant. Examples of commercially available anhydrous silica are those sold under the names "Cab-O-Sil" and "Santogel." The preferred gelling agent for use in the present invention is derived by the copolymerization of methyl vinyl ether and maleic anhydride.

Best advantage of the gelling agent is taken by the inclusion in the blasting agent of a cross-linking agent which functions with the particular gelling agent which is used. In many cases, these are metal salts, preferably chlorides or nitrates, but also acetates, hydroxides and sulfates of such metals as tin, chromium, lead, zirconium, iron, copper, zinc, nickel, manganese, cobalt, titanium and aluminum may be used.

While the present invention provides a blasting composition which is independent of the use of ammonium nitrate, it may be desirable for specific uses to include ammonium nitrate in the blasting composition. When used, ammonium nitrate can be present either as finely ground material or in the form of prills. Ammonium nitrate used in the compositions of this invention can be obtained as fertilizer grade prills, pellets or granules. The material should be preferably a particle size such that it will pass through a No. 6 U.S. Standard screen.

While it is not necessary for the practice of the present invention to include an additional fuel material, it may be convenient and practical in some cases depending upon the availability of materials to have an auxiliary oxidizable carbon-containing material of another type which is nitric acid-miscible or soluble. Useful auxiliary fuels are chosen from nitro compounds having one or more nitro groups attached to a saturated hydrocarbon moiety. Representative suitable nitric acid miscible or soluble materials are nitroparaffins such as nitromethane, nitroethane, dinitroethane, nitropropane, dinitropropane, nitrobutane, dinitrobutane, nitroisobutane, dinitroisobutane and the like.

It is often advantageous to include a density modifying agent in the formulations of the present invention, especially when such formulations are prepared from nitric acid solutions of less than 80% by weight nitric acid. Such density modifying agents are acid resistant materials which contain entrapped air such as perlite, hollow glass spheres or vermiculite. Other useful materials are frothing agents of non-ionic surfactant type, for example, esters of sorbitan with fatty acids, e.g., sorbitan monopalmitate, sorbitan monostearate, and sorbitan monolaurate.

Blasting compositions of the present invention should contain from 3 to 90% by weight of nitric acid of at least 30% concentration. Additionally, they must have a minimum of about 1.0% by weight of the nitroaromatic compound. In addition to these two materials, a gelling agent in a weight proportion of about 0.1 to about 10%, based on the weight of the entire composition, should be present. Through not entirely necessary, it is desirable to have up to about 5% by weight of a cross-linking agent to enhance the action of the gelling agent. Density modifying agents can be present in a concentration of up to about 10%. When ammonium nitrate is used as an auxiliary oxidizing agent, as much as 80% may be present in the explosive composition. In addition to the foregoing components, the blasting composition of the present invention may have up to about 35% of an additional nitric acid-miscible or soluble oxidizable fuel such as an aliphatic nitro fuel or other oxidizable carbon compounds. The amount of such material which is used is optional and will depend on such factors as desired properties of the blasting composition and the relative availability of the materials.

It is preferred to use for each 100 parts of anhydrous nitric acid 30 to 200 parts of the nitric acid-miscible or soluble aromatic nitro compound, 0 to 60 parts of the nitroparaffinic oxidizable fuel, 0 to 1000 parts of ammonium nitrate, 1 to 20 parts of the acid-stable gelling agent, 0.1 to 10 parts of cross-linking agent and 1 to 100 parts of water.

The fuel and oxidizer components used in this invention preferably should be present in such quantities as to give an oxygen balanced composition. By "oxygen balance" is meant there is sufficient oxygen in the composition to oxidize the fuel components to their maximum state of oxidation, e.g., combined carbon to carbon dioxide.

The various components of the blasting composition of this invention can be blended in any convenient manner although it may be necessary to apply moderate heat during the blending steps or to adjust the order of addition of the various components to enable effective blending to take place. However, the manner of preparing the material is not a part of the present invention.

The following examples are presented to illustrate the present invention. In the examples, parts and percentages are on a weight basis unless otherwise noted and the designation "EBC" is used to denote electric blasting cap.

EXAMPLE 1

Blasting composition with dinitrotoluene

| | |
|---|---|
| Nitric acid (90% aqueous) _____percent__ | 64.0 |
| Dinitrotoluene _____do____ | 32.0 |
| Cab-O-Sil M-5 _____do____ | 4.0 |
| | 100.0 |
| Density, g./cc. _____ | 1.44 |
| Detonation velocity (2" diam. confined) mps. __ | 6940 |

EXAMPLE 2

Blasting composition with dinitrotoluene

| | |
|---|---|
| Nitric acid (90% aqueous) _____percent__ | 9.0 |
| Dinitrotoluene _____do____ | 16.0 |
| Ammonium nitrate _____do____ | 74.0 |
| Gantrez AN-169 _____do____ | 1.0 |
| | 100.0 |
| Density, g./cc. _____ | 1.29 |
| Detonation velocity (3" diam. unconfined), mps. _ | 3320 |

EXAMPLE 3

Blasting composition with dinitrotoluene

| | |
|---|---|
| Nitric acid (87% aqueous) _____percent__ | 15.9 |
| Dinitrotoluene _____do____ | 18.1 |
| Ammonium nitrate _____do____ | 65.0 |
| Polyacrylamide _____do____ | 1.0 |
| | 100.0 |
| Density, g./cc. _____ | 1.37 |
| Detonation velocity (3" diam. unconfined), mps. _ | 3160 |

EXAMPLE 4

Blasting composition with dinitrotoluene

| | |
|---|---|
| Nitric acid (78% aqueous) _____percent__ | 16.9 |
| Dinitrotoluene _____do____ | 16.1 |
| Ammonium nitrate _____do____ | 65.0 |
| Gantrez AN-169 _____do____ | 1.5 |
| Polyacrylamide _____do____ | 0.5 |
| | 100.0 |
| Density, g./cc. _____ | 1.42 |
| Detonation velocity (1½" diam. unconfined), mps. _____ | 2380 |

EXAMPLE 5

Blasting composition with nitrobenzene

| | |
|---|---|
| Nitric acid (70% aqueous) _____percent__ | 17.0 |
| Nitrobenzene _____do____ | 10.0 |
| Sorbitan monopalmitate _____do____ | 1.5 |
| Ammonium nitrate _____do____ | 70.0 |
| Gantrez AN-169 _____do____ | 1.0 |
| Chromium nitrate (39% aqueous) _____do____ | 0.5 |
| | 100.0 |
| Density, g./cc. _____ | 1.40 |
| Detonation velocity (1½" diam. steel pipe), mps. _ | 3500 |

EXAMPLE 6

Blasting composition with nitrobenzene

| | |
|---|---|
| Nitric acid (90% aqueous) _____percent__ | 17.2 |
| Nitrobenzene _____do____ | 9.8 |
| Ammonium nitrate _____do____ | 70.0 |
| Gantrez AN-169 _____do____ | 3.0 |
| | 100.0 |
| Density, g./cc. _____ | 1.32 |
| Detonation velocity (1½" diam. steel pipe), mps. _ | 4570 |

EXAMPLE 7

Blasting composition with dinitrobenzene

| | |
|---|---|
| Nitric acid (70% aqueous) _____percent__ | 12.0 |
| Dinitrobenzene _____do____ | 15.0 |
| Sorbitan monopalmitate _____do____ | 1.5 |
| Ammonium nitrate _____do____ | 70.0 |
| Gantrez AN-169 _____do____ | 1.0 |
| Chromium nitrate (39% aqueous) _____do____ | 0.5 |
| | 100.0 |
| Density, g./cc. _____ | 1.31 |
| Detonation velocity (1½″ diam. steel pipe), mps. _ | 3720 |

EXAMPLE 8

Blasting composition with dinitrophenol

| | |
|---|---|
| Nitric acid (90% aqueous) _____percent__ | 29.0 |
| Dinitrophenol _____do____ | 20.0 |
| Ammonium nitrate _____do____ | 48.0 |
| Gantrez AN-169 _____do____ | 3.0 |
| | 100.0 |
| Density, g./cc. _____ | 1.10 |
| Detonation velocity (1½″ diam. steel pipe), mps. _ | 5000 |

EXAMPLE 9

Blasting composition with dinitrocresol

| | |
|---|---|
| Nitric acid (70% aqueous) _____percent__ | 12.5 |
| Dinitrocresol _____do____ | 14.5 |
| Sorbitan monopalmitate _____do____ | 1.5 |
| Ammonium nitrate _____do____ | 70.0 |
| Gantrez AN-169 _____do____ | 1.0 |
| Chromium nitrate (39% aqueous) _____do____ | 0.5 |
| | 100.0 |
| Density, g./cc. _____ | 0.85 |
| Detonation velocity (1½″ diam. steel pipe), mps. _ | 4100 |

EXAMPLE 10

Blasting composition with dinitrotoluene and nitromethane

| | |
|---|---|
| Nitric acid (90% aqueous) _____percent__ | 18.0 |
| Dinitrotoluene _____do____ | 12.0 |
| Nitromethane _____do____ | 7.0 |
| Ammonium nitrate _____do____ | 60.0 |
| Gantrez AN-169 _____do____ | 3.0 |
| | 100.0 |
| Density, g./cc. _____ | 1.43 |
| Detonation velocity (1½″ diam. steel pipe), mps. _ | 6200 |

EXAMPLE 11

Blasting composition with dinitrotoluene and nitropropane

| | |
|---|---|
| Nitric acid (90% aqueous) _____percent__ | 18.0 |
| Dinitrotoluene _____do____ | 7.0 |
| Nitropropane _____do____ | 7.0 |
| Ammonium nitrate _____do____ | 65.0 |
| Gantrez AN-169 _____do____ | 3.0 |
| | 100.0 |
| Density, g./cc. _____ | 1.41 |
| Detonation velocity (1½″ diam. steel pipe), mps. _ | 6150 |

EXAMPLE 12

Blasting composition with dinitrophenol

| | |
|---|---|
| Ammonium nitrate _____percent__ | 48.0 |
| Nitric acid (90% aqueous) _____do____ | 29.0 |
| Dinitrophenol _____do____ | 20.0 |
| Gantrez AN-169 _____do____ | 2.0 |
| Chromium nitrate (39% aqueous) _____do____ | 1.0 |
| Density, g./cc. _____ | 1.01 |
| Rate of detonation, mps. _____ | 5010 |
| Cap sensitivity _____ No. 16 EBC |

EXAMPLE 13

Blasting composition with dinitrophenylhydrazine

| | |
|---|---|
| Ammonium nitrate _____percent__ | 60.5 |
| Nitric acid (90% aqueous) _____do____ | 19.2 |
| Dinitrophenylhydrazine _____do____ | 17.8 |
| Sorbitan monopalmitate _____do____ | 1.5 |
| Gantrez AN-169 _____do____ | 1.0 |
| | 100.0 |
| Density, g./cc. _____ | 1.48 |
| Rate of detonation, m.p.s. _____ | 6110 |
| Cap sensitivity _____ No. 8 EBC |

EXAMPLE 14

Blasting composition with dinitroaniline

| | |
|---|---|
| Ammonium nitrate _____percent__ | 60.5 |
| Nitric acid (90% aqueous) _____do____ | 22.8 |
| Dinitroaniline _____do____ | 14.2 |
| Sorbitan monopalmitate _____do____ | 1.5 |
| Gantrez AN-169 _____do____ | 1.0 |
| | 100.0 |
| Density, g./cc. _____ | 1.41 |
| Rate of detonation, m.p.s. _____ | 7060 |
| Cap sensitivity _____ No. 8 EBC |

EXAMPLE 15

Blasting composition with nitrobenzaldehyde

| | |
|---|---|
| Ammonium nitrate _____percent__ | 60.0 |
| Nitric acid (90% aqueous) _____do____ | 22.0 |
| Nitrobenzaldehyde _____do____ | 15.0 |
| Sorbitan monopalmitate _____do____ | 1.5 |
| Gantrez AN-169 _____do____ | 1.0 |
| Chromium nitrate (39% aqueous) _____do____ | 0.5 |
| | 100.0 |
| Density, g./cc. _____ | 1.42 |
| Rate of detonation, m.p.s. _____ | 6000 |
| Cap sensitivity _____ No. 8 EBC |

EXAMPLE 16

Blasting composition with nitrobenzene

| | Percent |
|---|---|
| Nitrobenzene _____ | 25.0 |
| Nitric acid (90% aqueous) _____ | 70.0 |
| Cab-O-Sil EH-5 _____ | 5.0 |
| | 100.0 |

The blasting composition had the following properties:

| | |
|---|---|
| Reaction _____ | No |
| Rate of detonation, m.p.s., 1¼″ x 12″ steel pipe __ | 7650 |
| Density, g./cc. _____ | 1.46 |

EXAMPLE 17

Blasting composition with dinitrobenzene

| | Percent |
|---|---|
| Dinitrobenzene _____ | 38.0 |
| Nitric acid (90% aqueous) _____ | 57.0 |
| Cab-O-Sil M-5 _____ | 5.0 |
| | 100.0 |

The blasting composition had the following properties:

| | |
|---|---|
| Reaction _____ | No |
| Rate of detonation, m.p.s., 1¼″ x 12″ steel pipe __ | 7510 |
| Density, g./cc. _____ | 1.47 |

EXAMPLE 18

Blasting composition with chlorodinitrobenzene

| | Percent |
|---|---|
| Chlorodinitrobenzene | 36.0 |
| Nitric acid (90% aqueous) | 57.0 |
| Cab-O-Sil M-5 | 7.0 |
| | 100.0 |

The composition had the following properties:
| | |
|---|---|
| Reaction | No |
| Rate of detonation, m.p.s., 1¼″ x 12″ steel pipe | 7150 |
| Density, g./cc. | 1.55 |

EXAMPLE 19

Blasting composition with nitrobenzaldehyde

| | Percent |
|---|---|
| Nitrobenzaldehyde | 28.5 |
| Nitric acid (90% aqueous) | 66.7 |
| Cab-O-Sil M-5 | 4.8 |
| | 100.0 |

The blasting composition had the following properties:
| | |
|---|---|
| Reaction | Yes |
| Rate of detonation, m.p.s., 1¼″ x 12″ steel pipe | 6950 |
| Density, g./cc. | 1.41 |

EXAMPLE 20

Blasting composition with chloronitrotoluene

| | Percent |
|---|---|
| Chloronitrotoluene | 27.0 |
| Nitric acid (90% aqueous) | 68.0 |
| Cab-O-Sil M-5 | 5.0 |
| | 100.0 |

The blasting composition had the following properties:
| | |
|---|---|
| Reaction | No |
| Rate of detonation, m.p.s., 1¼″ x 12″ steel pipe | 7420 |
| Density, g./cc. | 1.53 |

EXAMPLE 21

Blasting composition with nitroxylene

| | Percent |
|---|---|
| Nitroxylene | 22.0 |
| Nitric acid (90% aqueous) | 73.0 |
| Cab-O-Sil M-5 | 5.0 |
| | 100.0 |

The blasting composition had the following properties:
| | |
|---|---|
| Reaction | Yes |
| Rate of detonation, m.p.s., 1¼″ x 12″ steel pipe | 6030 |
| Density, g./cc. | 1.46 |

EXAMPLE 22

Blasting composition with dinitrophenetole

| | Percent |
|---|---|
| Dinitrophenetole | 28.0 |
| Nitric acid (90% aqueous) | 67.0 |
| Cab-O-Sil M-5 | 5.0 |
| | 100.0 |

The blasting composition had the following properties:
| | |
|---|---|
| Reaction | No |
| Rate of detonation, m.p.s., 1¼″ x 12″ steel pipe | 7100 |
| Density, g./cc. | 1.45 |

EXAMPLE 23

Blasting composition with trinitrotoluene

| | Percent |
|---|---|
| Trinitrotoluene | 37.0 |
| Nitric acid (90% aqueous) | 60.0 |
| Cab-O-Sil EH-5 | 3.0 |
| | 100.0 |

The blasting composition had the following properties:
| | |
|---|---|
| Reaction | No |
| Rate of detonation, m.p.s., 1¼″ x 12″ steel pipe | 7490 |
| Density, g./cc. | 1.50 |

EXAMPLE 24

Blasting composition with nitrobenzene

| | | |
|---|---|---|
| Nitrobenzene | percent | 21.0 |
| Nitric acid (90% aqueous) | do | 74.0 |
| Lytron 810 | do | 3.0 |
| Chromium nitrate (39% aqueous) | do | 2.0 |
| | | 100.0 |

| | |
|---|---|
| Density, g./cc. | 1.42 |
| Rate of detonation, 1¼″ x 8″ unconfined with No. 6 EBC, m.p.s. | 7180 |

EXAMPLE 25

Blasting composition with trinitrotoluene

| | | |
|---|---|---|
| Trinitrotoluene | percent | 34.0 |
| Nitric acid (90% aqueous) | do | 60.0 |
| Lytron 810 | do | 4.0 |
| Chromium nitrate (39% aqueous) | do | 2.8 |
| | | 100.0 |

| | |
|---|---|
| Density, g./cc. | 1.48 |
| Rate of detonation, 1¼″ x 8″ unconfined with No. 6 EBC, m.p.s. | 7380 |

I claim:

1. A stable blasting composition of high blasting strength consisting essentially of:
   (a) 3 to 90 weight percent of nitric acid of about 30 to 90% concentration;
   (b) at least 1 percent by weight of a nitric acid-miscible or soluble nitroaromatic compound; and
   (c) at least 0.1 weight percent of a gelling agent.

2. The composition of claim 1 having up to 80 weight percent of ammonium nitrate.

3. The composition of claim 1 having at least 0.01 weight percent of a cross-linking agent.

4. The composition of claim 1 wherein the nitroaromatic compound is nitrobenzene.

5. The composition of claim 1 wherein the nitroaromatic compound is dinitrotoluene.

6. The composition of claim 1 wherein the nitroaromatic compound is trinitrotoluene.

7. The composition of claim 1 containing, for each 100 parts of anhydrous nitric acid, 30–200 parts of nitroaromatic compound; up to 60 parts of a nitroparaffinic oxidizable fuel; up to 100 parts of ammonium nitrate; 1–20 parts of acid-stable gelling agent; 0.1–10 parts of cross-linking agent; and 1–100 parts of water.

8. The composition of claim 7 wherein the gelling agent is selected from anhydrous silica, a copolymer of methyl vinyl ether and maleic anhydride and a copolymer of styrene and maleic anhydride.

9. The composition of claim 7 wherein the nitroaromatic compound is dinitrotoluene and the nitroparaffinc oxidizable fuel is nitromethane.

10. The composition of claim 7 wherein the nitroaromatic compound is dinitrotoluene and the nitroparaffinc oxidizable fuel is nitropropane.

References Cited

UNITED STATES PATENTS

| | | | |
|---|---|---|---|
| 3,216,872 | 11/1965 | Wells | 149—57 X |
| 3,242,019 | 3/1966 | Gehrig | 149—74 X |
| 3,296,044 | 1/1967 | Gehrig | 149—74 X |
| 3,306,789 | 2/1967 | Logan et al. | 149—74 X |
| 3,361,601 | 1/1968 | Chrisp | 149—74 X |

BENJAMIN R. PADGETT, *Primary Examiner.*

MELVIN J. SCOLNICK, *Assistant Examiner.*

U.S. Cl. X.R.

149—74, 57, 18, 105, 91